(12) United States Patent
Choi

(10) Patent No.: US 11,328,289 B2
(45) Date of Patent: *May 10, 2022

(54) SYSTEM AND METHOD FOR AUTHENTICATING ELECTRONIC MONEY USING A SMART CARD AND A COMMUNICATION TERMINAL

(71) Applicant: Unho Choi, Seoul (KR)

(72) Inventor: Unho Choi, Seoul (KR)

( * ) Notice: Subject to any disclaimer, the term of this patent is extended or adjusted under 35 U.S.C. 154(b) by 65 days.

This patent is subject to a terminal disclaimer.

(21) Appl. No.: 15/417,974

(22) Filed: Jan. 27, 2017

(65) Prior Publication Data

US 2017/0140369 A1    May 18, 2017

Related U.S. Application Data

(63) Continuation of application No. 13/510,856, filed as application No. PCT/KR2010/006699 on Sep. 30, 2010, now Pat. No. 9,589,260.

(30) Foreign Application Priority Data

Nov. 19, 2009  (KR) ........................ 10-2009-0111999

(51) Int. Cl.
*G06Q 20/38* (2012.01)
*G06Q 20/36* (2012.01)
(Continued)

(52) U.S. Cl.
CPC ........... *G06Q 20/363* (2013.01); *G06Q 20/06* (2013.01); *G06Q 20/065* (2013.01);
(Continued)

(58) Field of Classification Search
CPC ............................................... G06Q 20/40145
(Continued)

(56) References Cited

U.S. PATENT DOCUMENTS 5,754,654 A    5/1998 Hiroya et al.
6,505,193 B1 *  1/2003 Musgrave ............. H04L 9/3263
(Continued)

FOREIGN PATENT DOCUMENTS

JP         2008269511 A    11/2008
KR   10-2003-0000942 A     1/2003
(Continued)

OTHER PUBLICATIONS

International Search Report for PCT/KR2010/006699 (in Korean and English), dated Jun. 3, 2011; ISA/KR.
(Continued)

*Primary Examiner* — Chinedu C Agwumezie
(74) *Attorney, Agent, or Firm* — United One Law Group LLC; Kongsik Kim; Jhongwoo Peck

(57) ABSTRACT

The present invention relates to a system and a method for authenticating an electronic money using a smart card and a communication terminal. The present invention provides a system and a method for authenticating an electronic money, wherein the system comprises a smart card and a communication terminal. The smart card takes biometric signature from a user as an input, transmits recognition completion information to the communication terminal when the biometric signature inputted by the user matches the stored biometric signature, receives an update command from the communication terminal, updates the amount of stored balance data, and transmits an update completion message to the communication terminal. The communication terminal is connected to the smart card in a wired or wireless manner, and transmits the update command to the smart card upon receipt of the recognition completion information.

13 Claims, 4 Drawing Sheets

(51) Int. Cl.
- *G06Q 20/06* (2012.01)
- *G06Q 20/40* (2012.01)
- *G07F 7/08* (2006.01)
- *G06Q 20/32* (2012.01)
- *G06Q 20/34* (2012.01)
- *H04L 9/00* (2022.01)
- *H04L 9/30* (2006.01)
- *H04L 9/32* (2006.01)
- *H04L 29/06* (2006.01)
- *G06Q 20/10* (2012.01)
- *G06Q 20/20* (2012.01)
- *H04L 67/02* (2022.01)

(52) U.S. Cl.
CPC ......... *G06Q 20/1085* (2013.01); *G06Q 20/20* (2013.01); *G06Q 20/3223* (2013.01); *G06Q 20/349* (2013.01); *G06Q 20/3829* (2013.01); *G06Q 20/40145* (2013.01); *G07F 7/0886* (2013.01); *H04L 9/006* (2013.01); *H04L 9/30* (2013.01); *H04L 9/3231* (2013.01); *H04L 9/3263* (2013.01); *H04L 63/0428* (2013.01); *H04L 63/06* (2013.01); *H04L 67/02* (2013.01); *G06Q 2220/00* (2013.01); *H04L 2209/56* (2013.01)

(58) Field of Classification Search
USPC .......................................................... 705/75
See application file for complete search history.

(56) References Cited

U.S. PATENT DOCUMENTS

| | | | |
|---|---|---|---|
| 6,609,198 | B1 | 8/2003 | Wood et al. |
| 7,100,044 | B2 | 8/2006 | Watanabe et al. |
| 9,037,851 | B2 * | 5/2015 | Choi .................. H04W 12/069 |
| | | | 713/159 |
| 9,294,481 | B1 * | 3/2016 | Hoffman ................... G07C 9/37 |
| 9,589,260 | B2 * | 3/2017 | Choi .................. G06Q 20/3829 |
| 2002/0022966 | A1 | 2/2002 | Horgan |
| 2002/0083320 | A1 * | 6/2002 | Vatanen ................ H04L 9/3231 |
| | | | 713/168 |
| 2003/0115490 | A1 * | 6/2003 | Russo .................... G06Q 10/02 |
| | | | 340/5.82 |
| 2003/0195842 | A1 | 10/2003 | Reece |
| 2003/0208439 | A1 | 11/2003 | Rast |
| 2004/0025021 | A1 | 2/2004 | Aikawa et al. |
| 2006/0000917 | A1 | 1/2006 | Kim et al. |
| 2006/0219776 | A1 * | 10/2006 | Finn ..................... G06K 7/0043 |
| | | | 235/380 |
| 2007/0133846 | A1 * | 6/2007 | Andersson ........... G06Q 20/341 |
| | | | 382/124 |
| 2008/0110983 | A1 | 5/2008 | Ashfield |
| 2008/0148059 | A1 | 6/2008 | Shapiro |
| 2009/0235068 | A1 * | 9/2009 | Song .................... H04L 9/3231 |
| | | | 713/156 |
| 2011/0109431 | A1 * | 5/2011 | Bragagnini ............. G07C 9/38 |
| | | | 340/5.52 |
| 2013/0176108 | A1 * | 7/2013 | Madhani ................. G06F 21/32 |
| | | | 340/5.82 |

FOREIGN PATENT DOCUMENTS

| | | |
|---|---|---|
| KR | 10-2005-0051221 A | 6/2005 |
| KR | 10-2006-0060236 A | 6/2006 |
| KR | 10-2006-0117631 A | 11/2006 |
| KR | 10-2007-0038308 A | 4/2007 |
| KR | 10-2008-0036446 A | 4/2008 |
| KR | 10-2008-0113333 A | 12/2008 |

OTHER PUBLICATIONS

International Search Report for PCT/KR2010/006698 (in Korean and English), dated Jun. 23, 2011; ISA/KR.

\* cited by examiner

SYSTEM AND METHOD FOR AUTHENTICATING ELECTRONIC MONEY USING A SMART CARD AND A COMMUNICATION TERMINAL

CROSS-REFERENCE TO RELATED APPLICATIONS

This is a continuation application of U.S. application Ser. No. 13/510,856 filed May 18, 2012, which is a national phase application of PCT/KR2010/006699 filed Sep. 30, 2010, which claims priority under 35 U.S.C § 119(a) to Korean Serial No. 10-2009-0111999 filed Nov. 19, 2009, all of which are incorporated by reference herein in their entireties.

TECHNICAL FIELD

The present disclosure relates to a method and system for authorizing electronic money using a smart card and a communication terminal. More particularly, the present disclosure relates to a method and system for authorizing electronic money using a smart card and a communication terminal, intended to enhance the security by using a smart card that stores a biometric signature of the legitimate owner or user for use in an authentication process and thus prohibiting the use of unauthorized person when a user uses the biometric smart card charged with electronic money or uses a service from a remote place.

BACKGROUND

Foreign travelers or even local people carry cash and thus are exposed to loss or theft of the cash. Carrying big amount of cash would cause an inconvenience and a crime while carrying small amount of cash would cause another inconvenience of frequent withdrawal or exchange whenever necessary. An alternative measures to cope with this kind of problem is an electronic money or e-money. The e-money, however, has a pitfall that it lacks such functions as user authentication and therefore it is virtually impossible to be returned if lost.

DISCLOSURE

Technical Problem

Therefore, to solve the above-mentioned problems, the present disclosure seeks to provide a system and method for authentication electronic money using a smart card and a communication terminal, which improve the security capabilities by preventing the usage of abnormal users after logging into the system, excluding an authorized user, since the user either use a biometric authentication smart card charged with an electronic money, or use a smart card stored a biometric signature in order to authorize the user as using the service from a long-distance place.

SUMMARY

An embodiment of the present disclosure provides a system for authorizing an electronic money comprises: a smart card for receiving a biometric signature from a user, matching the biometric signature input from the user with a previously stored biometric signature of the user, transmitting an authentication completion information confirming the two biometric signature match each other, and updating a balance of the electronic money upon receiving an update command; and a communication terminal, connectable to the smart card in a wired or wireless way, for transmitting the update command to the smart card upon receiving the authentication completion information.

The authentication completion information comprises a URL (Uniform Resource Locator) and an authentication information, and the communication terminal executes an authentication process by transmitting the authentication information to the URL and transmits the update command to the smart card upon receiving an authorization success information from the URL.

The update command is a deduction signal which is generated periodically.

The biometric signature comprises at least one of fingerprint signature, vascular pattern information, voice pattern information, iris pattern information, and palm pattern information.

The smart card stores the fingerprint signature for a plurality of registered users, and selectively transmits an authorization information to the communication terminal depending on the fingerprint signature inputted by the user.

The authorization information comprises a PKI (public key infrastructure) certificate having an authentication code that matches the biometric signature.

The authentication information comprises a one-time password (OTP) generated by the smart card.

The authorization information comprises a code for authentication the user and a transmission time information of the authorization information.

The communication terminal requests the electronic money authentication service to the URL upon receiving the authorization success information from the URL, while transmits an update command to the smart card upon receiving the update command from the URL.

The smart card comprises a biometric signature scan and input section for receiving the biometric signature from the user; a biometric signature storage section for storing a biometric signature of registered subscribers; a PKI (public key infrastructure) certificate storage section; a biometric signature matching section for comparing the biometric signature inputted from the biometric signature scan and input section with the biometric signature stored in the biometric signature storage section to determine whether the two biometric signature matches each other or not, when the PKI (public key infrastructure) certificate for storing in the PKI (public key infrastructure) certificate storage section is received; and a PKI (public key infrastructure) certificate storage control section for storing the PKI (public key infrastructure) certificate in the PKI (public key infrastructure) certificate storage section, when the inputted biometric signature matches the stored biometric signature and an information that matches the biometric signature of the user is included in the PKI (public key infrastructure) certificate.

Another embodiment of the present disclosure provides a method for authorizing an electronic money comprises: receiving, at a smart card, a biometric signature input from a user, and transmitting an authentication completion information carrying an authentication on information to an uniform resource locator (URL) which is previously set when the inputted biometric signature and the stored biometric signature match each other: and receiving, at a smart card, an update command generated based on the authentication completion information and updating an amount of money for a stored balance data.

When a PKI (public key infrastructure) certificate is received, as the authorization information for storing in the smart card, in the first receiving step, the PKI (public key infrastructure) certificate is stored as the authorization information in case that both the inputted biometric signature and the stored biometric signature match each other and an information matching the user biometric signature is included in the PKI (public key infrastructure) certificate.

Advantageous Effects

It has an effect of improving security by double checking the biometric signature when using PKI (public key infrastructure) certificate as well as biometric signature. When using fingerprint signature as a plurality of biometric signature in user authorization, it has effect having further function of preventing abnormal usage of a stranger according to the fingerprint which is inputted to the smart card when performing user authorization by force. Additionally, it has an effect of multiplying user authorization as well as convenience of the user not inputting the password by confirming OTP one by one when authorizing the user by generating OTP automatically.

DETAILED DESCRIPTION

Figure 1:
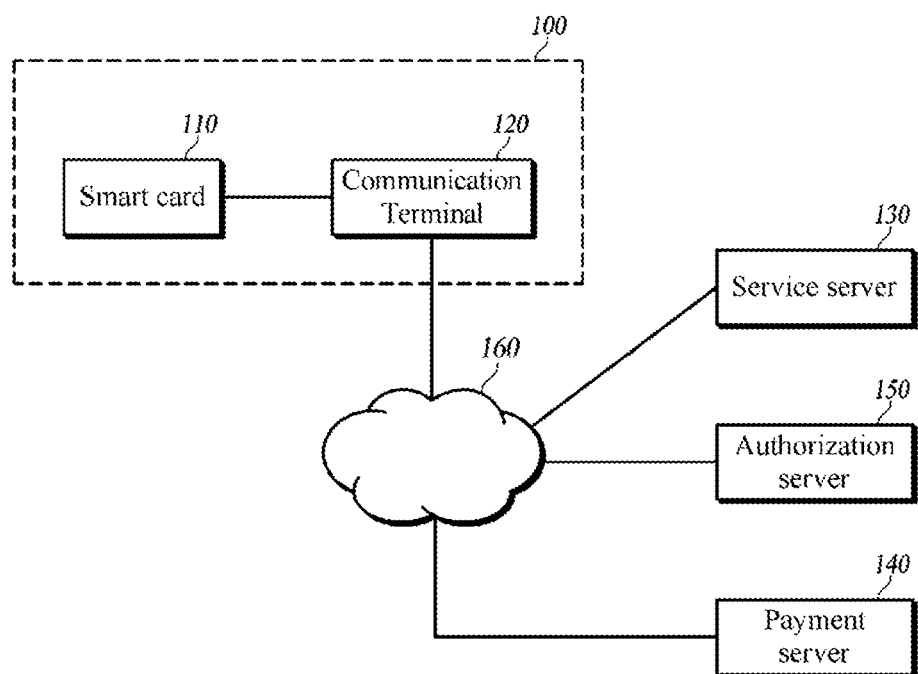
FIG. 1 is a block diagram illustrating a system for authorizing electronic money according to a preferred embodiment of the present invention.

Hereinafter, aspects of the present disclosure will be described in detail with reference to the accompanying drawings. In the following description, the same elements will be designated by the same reference numerals although they are shown in different drawings. Further, in the following description of the present disclosure, a detailed description of known functions and configurations incorporated herein will be omitted when it may make the subject matter of the present disclosure rather unclear.

Additionally, in describing the components of the present disclosure, there may be terms used like first, second, A, B, (a), and (b). These are solely for the purpose of differentiating one component from the other but not to imply or suggest the substances, order or sequence of the components. If a component were described as 'connected', 'coupled', or 'linked' to another component, they may mean the components are not only directly 'connected', 'coupled', or 'linked' but also are indirectly 'connected', 'coupled', or 'linked' via a third component.

FIG. 1 is a block diagram illustrating a system for authorizing electronic money according to a preferred embodiment of the present invention.

As shown in FIG. 1, the system for authorizing electronic money according to a preferred embodiment of the present invention includes a smart card 110 and a communication terminal 120.

The smart card 110 receives a biometric signature from a user, performs authentication process to check whether the biometric signature input from the user matches a previously stored biometric signature, and transmits an authentication completion information when the two biometric signatures match each other, updates the balance upon receiving an update command; and transmits an update completion message to the communication terminal 120 upon completing the update.

The communication terminal 120 is connected to the smart card 110 in a wired or wireless way, transmits the update command to the smart card 110 upon receiving the authentication completion information, and may transmit payment information to a service server 130 upon receiving the update completion message from the smart card 110. The payment information may include at least a payment success message and an amount of payment.

Further, the authentication completion information may include a balance data and/or authentication information.

The update of the balance data may involve either increase or decrease the balance amount. The update operation is a decrease command when the balance amount is decreased, while the update operation is an increase command when the balance amount is increased.

Now, in the preferred embodiment, it will be described with two separate cases: decreasing the balance data; and increasing the balance data. That is, the first case will be described in a first embodiment and the second case will be described in a second embodiment of the present invention.

The communication terminal 120 may be linked to a wired or a wireless network 160.

In the first embodiment of the present invention, if the balance data received at the communication terminal 120 is more or equal to the amount of money paid for using a service, the decrease amount of money, including the decreasing command for deducting the balance data as amount as the used amount of money, may be generated in the communication terminal 120. Alternatively, the communication terminal 120 may be equipped with an input unit for receiving input of the used amount of money. Further, the decrease amount of money including the decrease command may be delivered from the service server 120 to the communication terminal 120, and then the communication terminal 120 may transmit it to the smart card 110.

As described as above, when the decreasing command is transmitted from the communication terminal 120 to the smart card 110, the authorization process may be completed by using only the biometric signature of the smart card 110, without a separated authorization process using additional authorization information such as a PKI (public key infrastructure) certificate or a single-use or one-time password, etc. The PKI (public key infrastructure) certificate s is an electronic certificate issued from a certain authentication authority with which a business counterpart can be trusted when doing transaction on the web, and comprises user name of the PKI (public key infrastructure) certificate, validity, a public key to confirm digital signature of the user, and a digital signature of the certificate authority who certifies that it is authentic.

Figure 2:
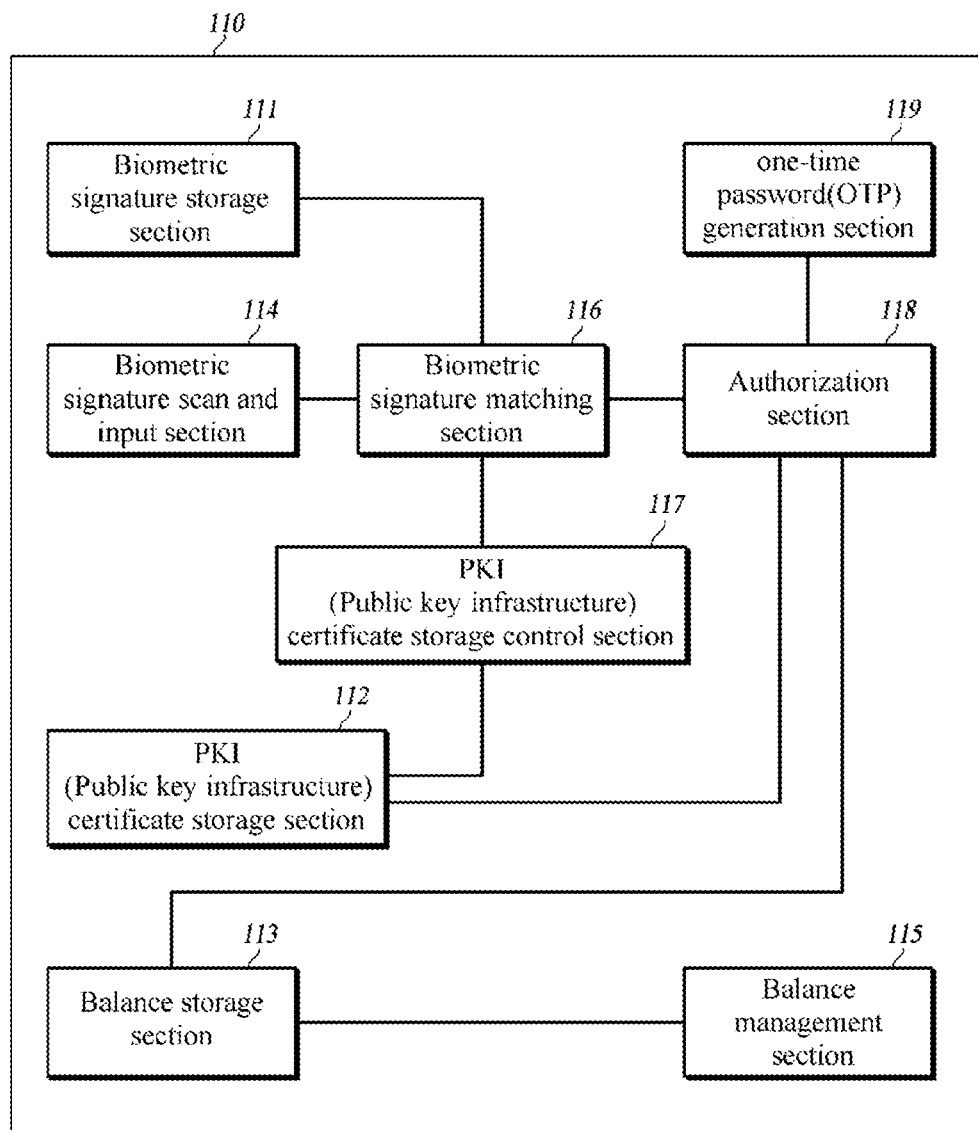
FIG. 2 is a block diagram prefiguratively illustrating a smart card used in a system for authorizing electronic money according to a preferred embodiment of the present invention.

FIG. 2 is a block diagram illustrating a smart card used in a system for authorizing electronic money according to a preferred embodiment of the present invention.

Referring to FIG. 2, the smart card 110 includes a biometric signature storage section 111, a PKI (public key infrastructure) certificate storage section 112, a balance storage section 113, a biometric signature scan and input section 114, an balance management section 115, a biometric signature matching section 116, a PKI (public key infrastructure) certificate storage control section 117, and further includes an authorization section 118, and an one-time password (OTP) generation section 119.

The biometric signature scan and input section 114 receives the biometric signature of the user or owner of the smart card 110. The biometric signature scan and input section 114 is implemented as a fingerprint pattern recognition sensor, an iris pattern recognition sensor, a vascular pattern recognition sensor, a voice pattern recognition sensor, a palm pattern recognition sensor, etc.

The authorization server 150 issues the PKI (public key infrastructure) certificate matching the authentication information of the registered user. To obtain the PKI (public key infrastructure) certificate, the user subscribes to a PKI (public key infrastructure) certificate issuing organization and registers his or her biometric signature. Preferably, the authorization server 150 may encode the registered biometric signature and inserts it into the PKI (public key infrastructure) certificate. Preferably, the biometric signature includes at least any one of fingerprint signature, vascular pattern information, voice pattern information, iris pattern information, and palm pattern information. In the preferred embodiment of the present invention, though it has been described that the authorization server 150 issues the PKI (public key infrastructure) certificate, it is merely an example and a separated PKI (public key infrastructure) certificate issuing server (not shown) may issue it.

The biometric signature storage section 111 may store the biometric signature of the registered subscriber issued from the authorization server 150. The biometric signature storage section 111 stores the biometric signature corresponding to the type of sensor of the biometric signature scan and input section 114. That is, in case the biometric signature scan and input section 114 is implemented as the fingerprint pattern recognition sensor, the biometric signature storage section 111 stores the fingerprint signature of the registered subscriber as the biometric signature, while the biometric signature scan and input section 114 is implemented as the iris pattern recognition sensor, the biometric signature storage section 111 stores the iris pattern information of the registered subscriber as the biometric signature.

The biometric signature storage section 111 further stores a plurality of biometric signatures for a registered subscriber. For example, in case of storing the fingerprint signature of the registered subscriber as the biometric signature, the fingerprint signature of each finger may be stored, while the iris pattern information of both eyes may be stored in case of storing the iris pattern information of the registered subscriber as the biometric signature.

The PKI (public key infrastructure) certificate storage section 112 stores the PKI (public key infrastructure) certificate issued by the authorization server 150. Here, it may be implemented that only the organization issuing the smart card 110 is allowed to store the PKI (public key infrastructure) certificate in the PKI (public key infrastructure) certificate storage section 112. But, in certain circumstances, however, the user may download the PKI (public key infrastructure) certificate by accessing the authorization server 150 through the network, and store the PKI (public key infrastructure) certificate in the PKI (public key infrastructure) certificate storage section 112, or take a copy of the certificate from a personal computer and store the PKI (public key infrastructure) certificate in the PKI (public key infrastructure) certificate storage section 112.

Meanwhile, when issuing the smart card 110, the PKI (public key infrastructure) certificate may be arranged to be stored in the PKI (public key infrastructure) certificate storage section 112 by the PKI (public key infrastructure) certificate storage control section 117. The PKI (public key infrastructure) certificate storage control section 117 determines whether the information matching the biometric signature of the user is included in the received PKI (public key infrastructure) certificate, if the biometric signature of the user inputted by the biometric signature scan and input section 114 duly matches the biometric signature stored in the biometric signature storage section 112 when the PKI (public key infrastructure) certificate is received to store in the PKI (public key infrastructure) certificate storage section 112. For example, a code matching the stored biometric signature may be stored in PKI (public key infrastructure) certificate storage section 112 together with the PKI (public key infrastructure) certificate; an authorization code of the received PKI (public key infrastructure) certificate may check whether the received authorization code matches the code stored in the PKI (public key infrastructure) certificate storage section 112. Further, the checking method may be implemented by data-processing the authorization code and comparing with the stored biometric signature and the method is not limited in this embodiment.

The PKI (public key infrastructure) certificate storage control section 117 stores the received PKI (public key infrastructure) certificate in the PKI (public key infrastructure) certificate storage section 112, when it is determined that the received PKI (public key infrastructure) certificate includes the information matching the biometric signature of the user. Therefore, the PKI (public key infrastructure) certificate storage control section 117 primarily can allow only the authorized user of the smart card 110 to store the PKI (public key infrastructure) certificate in the PKI (public key infrastructure) certificate storage section 112, and the PKI (public key infrastructure) certificate stored in the PKI (public key infrastructure) certificate storage section 112 secondly can be implemented to limit only to the PKI (public key infrastructure) certificate including the information matching the biometric signature for the authorized user. But, such PKI (public key infrastructure) certificate storage process is to intensify the authorization procedure by the smart card 110, as an alternative, it may be implemented to store the corresponding PKI (public key infrastructure) certificate even if it has no information matching the biometric signature of the user.

The biometric signature matching section 116 checks whether the biometric signature, which is inputted by the biometric signature scan and input section 114, matches the biometric signature stored in the biometric signature storage section 111. Namely, it is checked whether the biometric signature of a smart card user matches the biometric signature of the user registered in the authorization server 150.

When the biometric signature inputted through the biometric signature scan and input section 114 matches the biometric signature stored in the biometric signature storage section 111, the authorization section 118 transmits the authorization completion information to the communication terminal 120, and the communication terminal 120 may check the balance data and transmit the deduction command to the smart card 110.

If the authorization information (PKI (public key infrastructure) certificate and/or OTP) is additionally used for authorization besides the biometric signature, the URL (Uniform Resource Locator) and the authorization information stored in the smart card 110 are transmitted to the communication terminal 120 upon completion of the biometric signature authentication to transmit it to the service server 130 so that the current user of the smart card 110 is authorized as a legitimate user. Herein, it may be implemented that the communication terminal 120 transmits the authorization information to the URL previously set. The URL may represent an address of the service server 130, and the authorization information is authorized by using a self-authorization module or the authorization server 150 connected with the network 160 upon receiving it from the service server 130.

The authorization information may be implemented by at least one of the PKI (public key infrastructure) certificate stored in the PKI (public key infrastructure) certificate storage section 112, and an one-time password (OTP) generated by the one-time password (OTP) generation section 119. The authorization information may further comprise a code for proving the user and transmission time information and may transmit them together.

The authorization information being forwarded to the service server 130 may include unique information for proving user actions for future use. Preferably, this unique information is implemented as a bar code for checking an action time of the user and authorizing the user, or a digital signature of the user. In addition, the bar code and the digital signature of the user are implemented as being printable. The authorization information may further include transmission time information of the authorization information. Hence, the reliability for a mutual contract will be enhanced since the authorization operation using the smart card 110 may be printed as a user signature in a receipt or a voucher, etc.

If a plurality of biometric signatures are stored for subscribers registered in the biometric signature storage section 111, the authorization section 118 may be implemented to perform multiple different authorization processes, since the authorization section 118 is connected to multiple different URLs according to the biometric signature matching the biometric signature inputted from the biometric signature scan and input section 114.

The OTP generation section 119 generates the OTP in a prescribed manner by the issuance organization of the smart card 110. In this case, the OTP generated by the OTP generation section 119 may be implemented to display the user of the smart card 110, and the authorization section 118 may be implemented to transmit the authorization information to URL after passing through the authorization process on the user of the smart card 110 one more time through the OTP inputted by the user. Likewise, the OTP generated by the OTP generation section 119 may be prohibited to be viewed by the user of the smart card 110, and the authorization section 118 may combine the OTP generated by the OTP generation section 119 with at least one of the authorization information and transmits the combination to a preset URL, so that it can be implemented to authorize that the corresponding smart card 110 was issued by the authorized issuance organization. Herein, the OTP may be either generated by the user's pushing a corresponding button or automatically generated by the user's inputting the biometric signature.

The balance storage section 113 stores the balance amount of money for the electronic money remaining in the smart card 110, the balance management section 115 receives a decrease command from the communication terminal 120 and decreases the balance amount of money remaining in the balance storage section 113.

Figure 3:
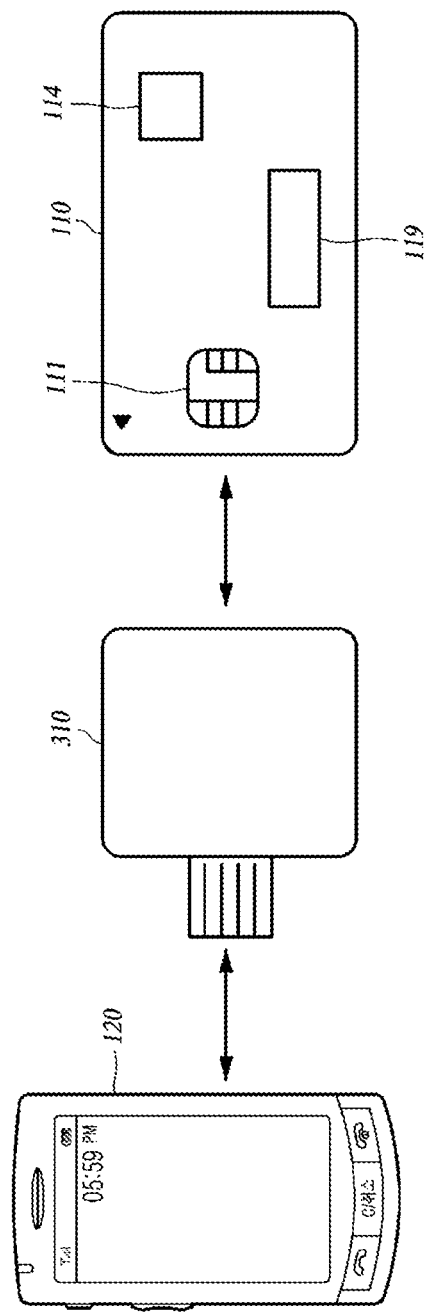
FIG. 3 is a view illustrating a connection status between a smart card and a communication terminal according to a preferred embodiment of the present invention.

FIG. 3 is a view illustrating a connection status between a smart card 110 and a communication terminal 120 according to a preferred embodiment of the present invention. As shown in FIG. 3, the communication terminal 120 is implemented as a mobile communication terminal, and a dongle 310 having USB terminal for use in linking the smart card 110 to the mobile communication terminal. Preferably, the dongle 310 has a card recognition section (not shown) for recognizing the smart card 110 in a contact manner or an insert manner.

In the preferred embodiment of the present invention, although the smart card 110 is depicted as being implemented as a shape of an ordinary credit card, a debit card, or a traffic card, etc., and it may be implemented as an information protection token, etc.

The communication terminal 120 is depicted as mobile terminals such as a PDA, a cellular phone, a notebook, but it may be implemented as communication devices, connected to a network through wired network, such as a desk top, Automated Teller Machine (ATM), Kiosk.

Moreover, as illustrated in Figure, although the smart card 110 and the communication terminal 120 are separately configured, but it is not limited to this configuration. The smart card 120 and the communication terminal 120 can be combined to implement as one user authorization apparatus. Namely, the communication terminal 120 comprises a biometric signature scan and input section 114 for receiving biometric signature of the user, and can be implemented to authorize the user by using the PKI (public key infrastructure) certificate matching the biometric signature of the user. In this case, the communication terminal 120 can be implemented to store the PKI (public key infrastructure) certificate matching the biometric signature of the user itself and to authorize the user by using the stored PKI (public key infrastructure) certificate, and can be implemented to authorize the user by receiving the PKI (public key infrastructure) certificate matched from the computer or USB memory.

Once the smart card 110 receives a fingerprint signature from the user through the biometric signature scan and input section 114, and the biometric signature matching section 116 determines that the information inputted from the user matches the fingerprint signature stored in the biometric signature storage section 111, the stored balance data can be transmitted to the communication terminal 120 along with the authorization information.

The PKI (public key infrastructure) certificate issued from the authorization server 150 certifies the match of the biometric signature stored in the biometric signature storage section 111, and may include registered user information and an authorization code. The authorization server 150 receives a PKI (public key infrastructure) certificate from the communication terminal 120, and authorizes the user by confirming whether the PKI (public key infrastructure) certificate is a valid PKI (public key infrastructure) certificate.

Meanwhile, the fingerprint signature on a plurality of fingers of the user can be stored as the biometric signature in the biometric signature storage section 111 of the smart card 110. For example, in case of storing the fingerprint signature of a plurality of fingers (For example, fingerprint signature of a thumb and an index finger) in the biometric signature storage section 111, when a user authorizes herself or himself by inputting the biometric signature, one of fingerprint signature (For example, fingerprint signature of a thumb) may be used for a normal authorization. Additional authorization can be executed in authorizing using other finger (For example, an index finger), for example, when the fingerprint signature on a plurality of fingers of the registered subscriber is stored as the biometric signature in the biometric signature storage section 111, then the communication tunnel is established as a safety management server such as a police server by one of any fingerprint signature, and the emergency signal is transmitted to the server. It is implemented to send a report with the fingerprint signature when it is a case for the user to execute the authorization process by using the smart card 110 in force by the threat of a stranger.

Meanwhile, the URL (For example, address of the service server 130) set for transmitting the authorization information can be stored in a prescribed place within the smart card 110 or biometric signature, or in combination with authorization information. The URL can also be transmitted when the authorization information is transmitted to the communication terminal 120 from the smart card 110.

The service server 130, having a designated URL, can be shopping malls sever or a payment server in case for a user to use the mobile communication terminal to access the shopping mall server to purchase goods. In case for a user to do internet banking using the mobile communication terminal 120, the server of the corresponding bank can be the service server 130 and a URL of the corresponding bank will be designated.

The service server 130 receives the PKI (public key infrastructure) certificate and/or OTP included in the received authorization information, and authorizes the user by confirming whether the stored authorization related information matches the PKI (public key infrastructure) certificate and/or OTP. Upon completion of the authorization, the authorization success information is transmitted to the communication terminal 120, and the communication terminal 120 transmits the deduction command to the smart card 110 after comparing the data which will be deducted from the amounts of balance data.

The service server 130 transmits the authorization success message to the communication terminal 120 when the user authorization is completed. When receiving the authorization success message, the communication terminal 120 transmits the deduction command including amount of deducting (Namely, deduction data) to the smart card 110, and the smart card 110 receives the deduction data, calculates the deduction data therein and decreases the amount of balance data as much as deduction data.

The service server 130 provides various services for the authorized user on the basis of the PKI (public key infrastructure) certificate issued by the authorization server 150. Herein, the service providing server 130 has URL connected to the network 160, authorizes the user by receiving authorization information from the smart card 110 through the network 160, provides content to the authorized user through the network 160, and provides services such as home-shopping service using IPTV, offline product sale, rental, money transfer, payment. Namely, the service server 130 may include various servers for performing services such as payment for purchase of the user, product or service provision, internet banking business, etc.

In case of purchasing goods in a shop, when a user having the smart card 110 shows intention to pay with the smart card 110 after purchasing the goods, the clerk inputs the price of product into the prescribed terminal (Herein, POS terminal of the shop can be the communication terminal 120) by using a prescribed input means, and the smart card 110 is connected to the communication terminal 120 of the shop by the user.

The communication terminal 120 may connect to the smart card 110 by the wired or wireless communication method. Upon receiving authentication completion information from the smart card 110, the communication terminal 120 confirms whether the balance data is less than the price of the goods or not in case when balance data is included in the authentication completion information, and when it is determined that the payment with the balance data is possible, the deduction command which includes the deduction data corresponding to the price of the goods is transmitted to the smart card 110. If the balance data is not enough for the payment, an error sound is generated to indicate the lack of balance of the smart card 110. The smart card 110 receives deduction data from the communication terminal 120 and transmits an update completion message to the communication terminal 120 upon deducting the amount of balance data stored in the balance storage section as much as the deduction data. The method of deducting the amount of the smart card 110 is to calculate the balance after the deduction from the communication terminal 120, to transmit the balance data after the deduction to the smart card 110, and to complete the payment by storing the balance data in the smart card 110.

If the balance data is not included in the authentication completion information which is to be transmitted to the communication terminal 120 from the smart card 110, the comparison between the balance data and the deduction data may be performed in the smart card 110. Merely, the communication terminal 120 which has received the authorization success information transmits the deduction command including the deduction data to the smart card 110. The smart card 110 which has received the deduction data compares the balance data with the deduction data, and if the balance data is not less, the amount of the balance data stored in the balance storage section 113 is deducted as much as the deduction data, and the update completion message is transmitted to the communication terminal 120.

Likewise, there are several methods of deducting from balance data with deduction command, and the present invention is not limited to this.

Upon receiving the update completion message from the smart card 110, the communication terminal 120 transmits the payment information to a prescribed server (service server 130 or payment server 140, here it is the service server 130). The payment information can be transmitted in real time, and several payment information can be collected and gathered along with other payment information at certain time and can be transmitted to the service server 130.

In case that the user is served by the remote service server 130 by performing the user authorization using the communication terminal 120, the communication terminal 120 receives the authentication completion information from the smart card 110 and transmits the service request to the service server 130. Making a call with the mobile communication terminal 120 is an example. In this case, the mobile communication terminal 120 executes programs for authorization of call and recognition of smart card transmits service request (request for a call) along with the telephone number to the service server 130 after receiving the authentication completion information and the telephone number from the smart card 110, and transmits the deduction command including deduction data to the smart card 110 by calculating update data (deduction data) from the deduction signal after receiving the update signal (deduction signal) from the service server 130 periodically during or after the service.

In case of transmitting the balance data along with the authentication completion information to the communication terminal 120 from the smart card 110, the communication terminal 120 may prohibit the call connection when the balance data is not sufficient. The communication terminal 120 may allow the service server 130 to determine whether the balance data is sufficient for a call attempt by transmitting the received balanced data to the service server 130. If the balance data received from the communication terminal 120 is not sufficient for a call attempt, the service server 130 sends the message indicating that no more service will be allowed, and makes the communication terminal 120 stop the call along with the call stopping message.

The deduction signal that the communication terminal 120 receives from the service server 130 comprises deduction data, and the communication terminal 120 can extract the deduction data from the deduction signal.

Two or more functions of service server 130, payment server 140, and authorization server 150, can be modularized and can be implemented in single server.

When making a call with the mobile communication terminal 120, the deduction signal may be transmitted periodically during the call, to the communication terminal 120 from the service server 130. A situation of insufficient funds may occur since the call bill exceeds the balance data of the smart card 110 due to unchecked big call volume, which can be prevented by executing the payment in periodical basis like a public payphone. According to the embodiment, the deduction signal can be generated at once, instead of being generated periodically, once the call service is completed. This embodiment is not limited to the telephone call, but also can be applied to all cases of payment with smart card 110 and communication terminal 120 after using services provided by the service server 130.

When the biometric signature stored in the smart card 110 fails to match the biometric signature recognized at the biometric device 111, or the authorization with the authorization information has failed in the service server 130, then the authorization failure message is generated and transmitted to the communication terminal 120. The communication terminal 120, which received the authorization failure message from the service server 130, can generate a warning signal indicating authorization error such as a warning sound or a warning light.

The smart card 110 stores fingerprint signature for a plurality of fingers of the registered subscriber, and selectively transmits to the communication terminal 120, any of the fingerprint signature depending on the fingerprint signature inputted by the user.

As described above, in case of storing a plurality of fingerprint signature (thumb and index finger) as the biometric signature, the normal user authorization may be performed as described above when the user performs the authorization using a thumb, but abnormal authorization process may be performed when attempting authorization using an index finger. For example, in the situation when a user is forced by someone to authorize himself or herself using the smart card 110, and intentionally uses his or her index finger, the authentication completion information including the authorization information is generated and transmitted to the communication terminal 120 from the smart card 110, and the communication terminal 120 transmits it to the service server 130.

The authorization server 150 which received the authorization information for index finger fingerprint signature confirms the abnormal authorization by checking registered information, denies the authorization, registers the corresponding smart card 110 as an authorization prohibited smart card so that further authorization may be prohibited, or goes through a process different from normal authorization, which files a report to the related authority. The authorization server 150 may store access address corresponding to the index finger fingerprint signature in the smart card, and authorizes the fingerprint signature and then may perform separate operation as it accesses to a server which is different from the normal service server by transmitting the corresponding access address (For example, access address of a reporting center) when transmitting the authorization information to the communication terminal. The security of the smart card 110 can be reinforced by using a plurality of fingerprint signature.

By performing an authorization for accessing to the corresponding service server 130, the process of inputting user ID and passcode which is required from the corresponding service server 130 can be omitted, which enables single-sign-on, concrete authorization. The authorization of the user can be made concrete and simple by using a communication terminal by performing the authorization using biometric signature of the smart card 110 and PKI (public key infrastructure) certificate as well even while on the move.

The log data of user authentication using the smart card 110 may be designed by the log data storage section (not illustrated). When the log data storage section confirms the user again based on the OTP at service server 130 side, the log data thereof should be stored together.

Such log data can be used for future use as a confirmation of the conduct of a user. For example, signature of the user may be included in the authentication information which is provided to the service server 130, and can be provided as printed material or electronic file on the electronic receipt or on the bill, by storing such signature information along with the log data.

Through such processes, the log data stored in the log data storage section can be used as an evidence of legal issue occurred in relation with the use of the smart card 110, and as means of preventing occurrence of other future problems.

FIG. 1 is a block diagram illustrating a system for authorizing electronic money according to a preferred embodiment of the present invention.

As illustrated in FIG. 1, the system for authorizing electronic money in accordance with second embodiment of the present disclosure comprises a smart card 110 and a communication terminal 120.

The smart card 110 receives a biometric signature from a user, performs matching of the biometric signature inputted from the user with previously stored biometric signature, transmits an authentication completion information upon confirming the match, and receives an increase command from the communication terminal 120, increases the amount of balance and transmits the increase completion message to the communication terminal 120.

The communication terminal 120 connects itself to the smart card 110 in a wired or wireless way, transmits the increase command to the smart card 110 upon receiving the authentication completion information from the smart card 110, and receives increase completion message from the smart card 110. Upon receiving the increase completion message, payment information may be transmitted to the corresponding service server 130.

When the smart card 110 increases the balance data, a balance data storage section 115 receives increase command from the communication terminal 120 and increases the balance data of the balance data storage section.

The case of increasing the amount in the smart card 110 using the communication terminal 120 may be applied when receiving change into the smart card 110 at the store, and when receiving cash besides change.

The authentication completion information may comprise a URL (Uniform Resource Locator) and authentication information. The communication terminal 120 connects itself to the smart card 110 in a wired or wireless way, and executes an authentication by transmitting the authentication information to the URL and transmits the increase command to the smart card 110 upon receiving the authentication success information from the URL.

The authentication information can be a PKI (public key infrastructure) certificate including an authentication code matching the biometric signature stored in the smart card 110, and the service server 130 authorizes the user by combining the PKI (public key infrastructure) certificate with information for authorization which is previously stored.

The authentication information can be an OTP generated from the smart card 110, and the service server 130 authorizes the user by receiving the OTP.

The smart card 110 stores the fingerprint signature for a plurality of fingers of the registered user and selectively transmits different authorization information depending on the fingerprint signature inputted by the user to the communication terminal 120.

The smart card 110 and the communication terminal 120 for authenticating the user by inter-working with the service server 130 in the second embodiment of the present disclosure can be performed in a similar manner as the system for authorizing electronic money in accordance with the first embodiment of the present disclosure.

Figure 4:
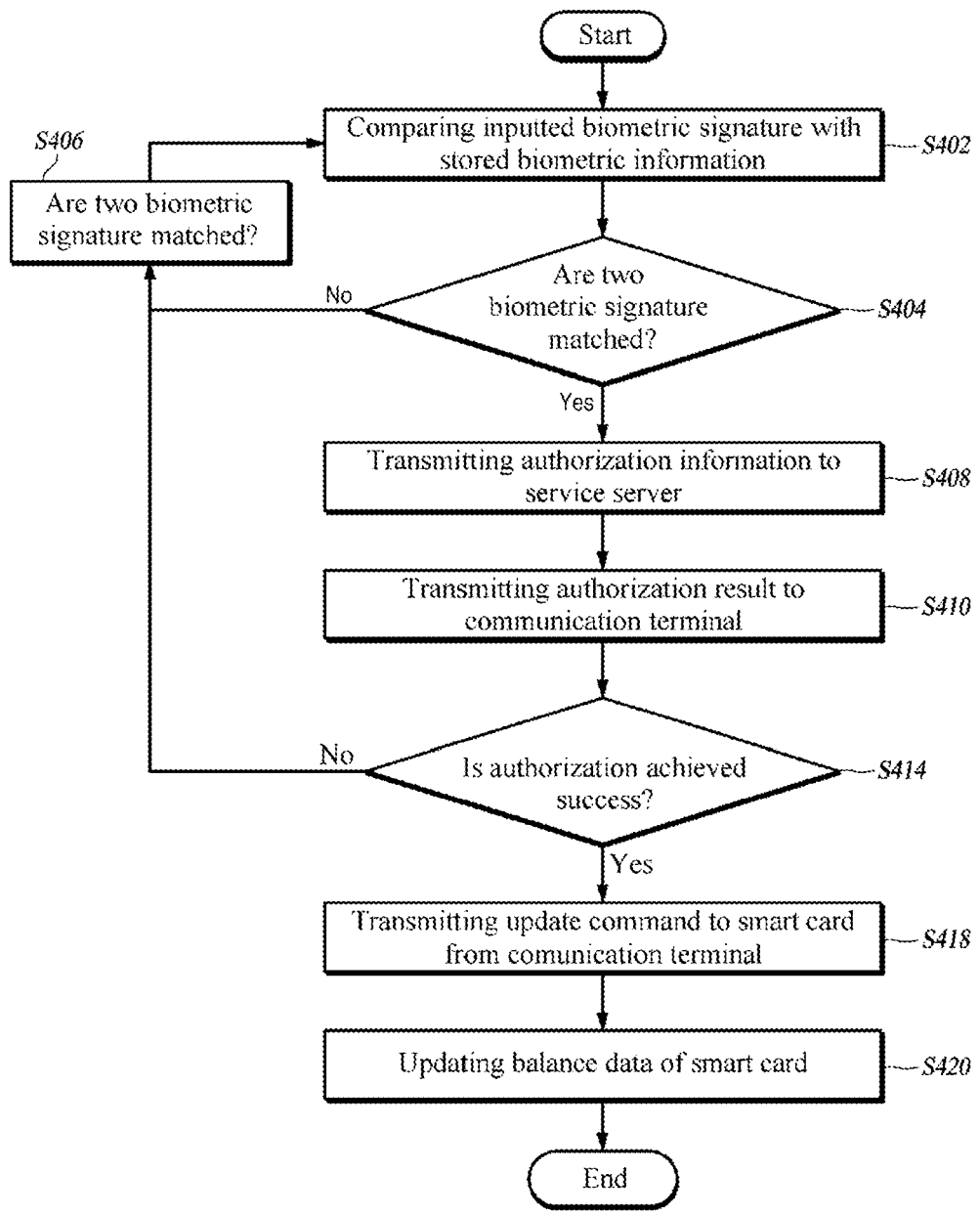
FIG. 4 is a flowchart illustrating a method for authorizing electronic money according to a preferred embodiment of the present invention.

FIG. 4 is a flow chart illustrating an example of the system for authorizing electronic money in accordance with the first embodiment of the present disclosure.

The system for authorizing electronic money in accordance with the first embodiment of the present disclosure is described by referring to the FIGS. 1 through 4.

The system for authorizing an electronic money in accordance with the first embodiment of the present disclosure comprises a step of transmitting an authentication completion information including an authorization information to the predetermined URL after the smart card receives the biometric signature from the user and the biometric signature inputted by the user matches the stored biometric signature, and a step of updating the amount of the stored balance data after the smart card receives an update command generated based on the authentication completion information. Herein, when a PKI (public key infrastructure) certificate to be stored in the smart card is received, the PKI (public key infrastructure) certificate can be stored as the authorization information in case that the inputted biometric signature matches the stored biometric signature and that the information matching the biometric signature of the user is included in the received PKI (public key infrastructure) certificate.

For example, when a user purchases goods in a store or receives other services the user authentication is performed using the smart card and the communication terminal.

First, the biometric signature inputted by the user in the biometric signature scan and input section of the smart card is compared with the biometric signature previously stored in the smart card (S402). It is checked whether the two biometric signatures matches each other (S404), and the warning sound is generated if the two biometric signatures fail to match each other (S406).

When the two biometric signature match each other, the authorization information is transmitted from the smart card through the communication terminal to the predetermined URL (S408).

The service server (assuming that the server has a URL address) transmits the authorization result to the communication terminal after authorizing the received authorization information (S410).

The communication terminal checks whether the authorization result is a success or not (S414), transmits a deduction command to the smart card 110 if the authorization is a success (S418), and generates a warning sound if the matching is not confirmed (S406).

The smart card which received the deduction command deducts the balance as much as the deduction data (S420).

If the communication terminal 120 transmits the increase command to the smart card 110, the smart card increases the balance by as much as the increase data included in the increase command (S420).

According to the embodiment of the present disclosure, when using biometric smart card in which electronic money is charged and using a service from a remote place, the usage of an unauthorized person can be prevented and thus the security can be improved by using the smart card in which the biometric signature is stored for user authentication.

When accessing an Internet banking system with the smart card 110, the process of inputting ID of the user attempting to access the Internet banking service providing server 130 may be replaced with the establishment of the communication tunnel based on the biometric signature of the user, and the process of inputting a password by the user can be replaced with the process of transmitting a PKI (public key infrastructure) certificate through the established communication tunnel. Moreover, entering the password of the PKI (public key infrastructure) certificate can be replaced with comparing the biometric signature inputted by the user with the matching information included in the PKI (public key infrastructure) certificate. As described above, establishing a tunnel and performing authentication with the smart card 110 obviates inputting ID and password requested from the corresponding service providing server 130 to enable a single-sign-on, and more concrete authentication of the user becomes possible.

The authentication of the user can be reinforced while simplifying the access to hope-for site on the road using communication terminal by performing the authorization execution using biometric signature of the smart card 110 and PKI (public key infrastructure) certificate.

Security can be improved by double-checking the biometric signature if the PKI (public key infrastructure) certificate as well as the biometric signature are both used.

If fingerprint signature as the plurality of biometric signature in the user authentication is used, it is advantageous that prevention of abnormal usage by a stranger who forces the legitimate user into performing the authentication process.

Moreover, authorization ways can be provided and convenience of the user can be improved by not requiring the password input, because the inventive method authorizes the user by automatically generating the OTP.

As above, even though it is explained that all components comprising the preferred embodiment of the present invention are combined or operated after combined, the present invention is not always limited to such preferred embodiment. That is, at least one of those all components can be combined selectively and can be operated. Also, all components can be implemented respectively as an independent hardware, but also it can be implemented as the computer program having program module which performs some or all functions that are combined in one or a plurality of hardware, as some or all of each components are combined selectively. The codes and code segments comprising the computer program can be easily inferred by the person in charge of technical field of the present invention. Such computer program is stored in the computer readable media, and is read and executed by the computer, and can embody the preferred embodiment of the present invention. A magnetic record media, an optical record media, and a carrier wave media are comprised as the computer program storage media.

In the description above, although all of the components of the embodiments of the present disclosure may have been explained as assembled or operatively connected as a unit, the present disclosure is not intended to limit itself to such embodiments. Rather, within the objective scope of the present disclosure, the respective components may be selectively and operatively combined in any numbers. Every one of the components may be also implemented by itself in hardware while the respective ones can be combined in part or as a whole selectively and implemented in a computer program having program modules for executing functions of the hardware equivalents. Codes or code segments to constitute such a program may be easily deduced by a person skilled in the art. The computer program may be stored in computer readable media, which in operation can realize the aspects of the present disclosure. As the computer readable media, the candidates include magnetic recording media, optical recording media, and carrier wave media.

In addition, terms like 'include', 'comprise', and 'have' should be interpreted in default as inclusive or open rather than exclusive or closed unless expressly defined to the contrary. All the terms that are technical, scientific or otherwise agree with the meanings as understood by a person skilled in the art unless defined to the contrary. Common terms as found in dictionaries should be interpreted in the context of the related technical writings not too ideally or impractically unless the present disclosure expressly defines them so.

Although exemplary aspects of the present disclosure have been described for illustrative purposes, those skilled in the art will appreciate that various modifications, additions and substitutions are possible, without departing from essential characteristics of the disclosure. Therefore, exemplary aspects of the present disclosure have not been described for limiting purposes. Accordingly, the scope of the disclosure is not to be limited by the above aspects but by the claims and the equivalents thereof.

The invention claimed is:

1. A portable apparatus comprising:
one or more biometric sensors;
one or more memories storing computer program instructions;
a first biometric digital signature of a person who has been registered and authorized to use the portable apparatus; and
a public key infrastructure (PKI) certificate that includes a first code derived from encoding the first biometric digital signature of the registered person; and
one or more processors operative to execute the computer program instructions from the one or more memories to cause the portable apparatus to:
acquire, by the one or more biometric sensors, biometric pattern of a person who attempts to access the portable apparatus;
determine whether the biometric pattern of the person who attempts to access the portable apparatus is matched with the first biometric digital signature of the registered person and the first code derived from encoding the first biometric digital signature of the registered person; and
in response to determination that the biometric pattern of the person who attempts to access the portable apparatus is matched with the first biometric digital signature of the registered person and the first code derived from encoding the first biometric digital signature of the registered person, transmit authentication information to a remote server over a network, wherein the authentication information includes the PKI certificate in which the first code derived from encoding the first biometric digital signature of the registered person is inserted,
wherein the one or more biometric sensors, the one or more memories, and the one or more processors are disposed in a single portable apparatus.

2. The portable apparatus of claim 1, wherein the authentication information further includes a one-time password.

3. The portable apparatus of claim 1, wherein the authentication information further includes information indicating the time when the authentication information is transmitted, information corresponding to a signature made by the registered person, or both.

4. The portable apparatus of claim 1, wherein the one or more memories store a second biometric digital signature of the registered person, wherein the second biometric digital signature of the registered person is different from the first biometric digital signature of the registered person.

5. The portable apparatus of claim 4, wherein the second biometric digital signature of the registered person has a usage that is different from a usage of the first biometric digital signature of the registered person.

6. The portable apparatus of claim 1, wherein the portable apparatus is a personal digital assistant (PDA).

7. The portable apparatus of claim 1, wherein the portable apparatus is an automated teller machine (ATM), a kiosk, a POS terminal, or a set-top box.

8. The portable apparatus of claim 1, wherein the portable apparatus is a mobile phone.

9. The portable apparatus of claim 1, wherein the portable apparatus is a smart card.

10. The portable apparatus of claim 1, wherein the portable apparatus is a notebook computer or a desktop computer.

11. The portable apparatus of claim 1, wherein the portable apparatus is a dongle.

12. The portable apparatus of claim 1, wherein the one or more memories further store information of a balance of electronic money.

13. The portable apparatus of claim 1, wherein the one or more biometric sensors include a fingerprint pattern recognition sensor, an iris pattern recognition sensor, a vascular pattern recognition sensor, a voice pattern recognition sensor, a palm pattern recognition sensor, or a combination thereof.

* * * * *